UNITED STATES PATENT OFFICE.

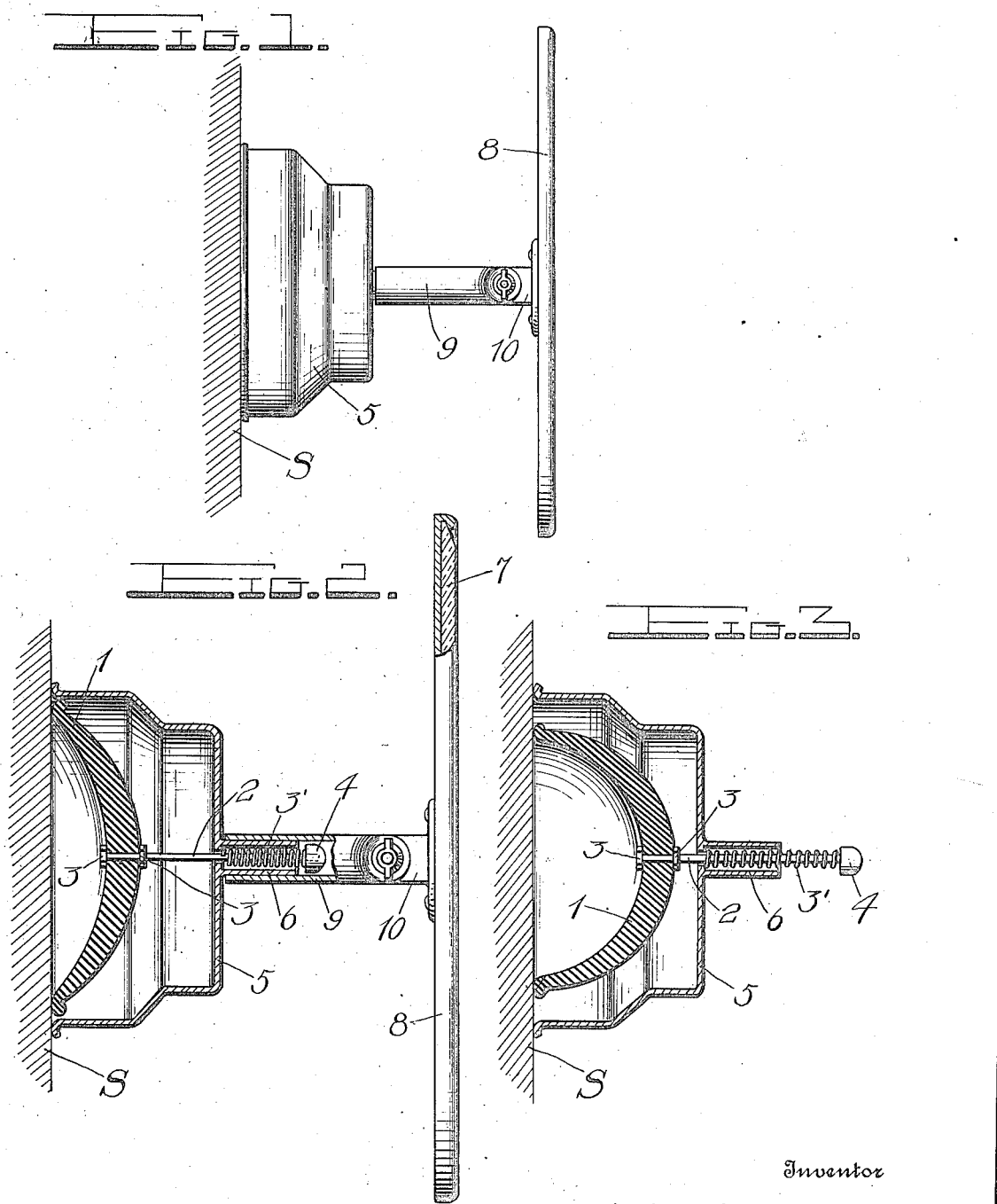

JOHN G. KNABE, OF WATERTOWN, SOUTH DAKOTA.

SUCTION SUPPORTING DEVICE FOR MIRRORS.

1,147,102.   Specification of Letters Patent.   Patented July 20, 1915.

Application filed September 8, 1914. Serial No. 860,715.

*To all whom it may concern:*

Be it known that I, JOHN G. KNABE, a citizen of the United States, residing at Watertown, in the county of Codington and State of South Dakota, have invented certain new and useful Improvements in Suction Supporting Devices for Mirrors; and I do declare the following to be a full, clear, and exact description of the invention, such as will enable others skilled in the art to which it appertains to make and use the same.

This invention relates to improvements in suction supporting devices especially designed for use in connection with shaving mirrors.

The object of the invention is to provide a simply constructed, durable and efficient device of this character which may be readily adjusted in any place or position without marring or defacing the object on which it is mounted.

Another object is to provide a mirror which can be readily folded and transported and set up or hung in the most advantageous position in order that its user may enjoy the proper light which is especially desirous when shaving.

With these and other objects in view, the invention consists of certain novel features of construction, combination and arrangement of parts as will be more fully described and claimed.

In the accompanying drawings: Figure 1 represents a side elevation of a mirror equipped with this improved supporting device; Fig. 2 is a side elevation or edge view of the mirror with its support shown in central vertical section and applied; Fig. 3 is a central vertical section of the supporting member detached in position ready for application.

In the embodiment illustrated a suction cup 1 of rubber or other suitable material is shown which tapers in cross section toward its edges. A stem or shank 2 is centrally mounted in the cup 1 and is here shown secured therein by clamping nuts 3. A coiled spring 3' encircles this stem 2 and a knob 4 is mounted on the free end of said shank for holding the spring in position on the shank and also is designed for operating the cup to cause it to engage the supporting surface to which it is to be applied as will be hereinafter more fully described.

An inclosing casing 5 is here shown encircling the cup 1 and of greater diameter than said cup and is provided at its outer end with a laterally projecting tube 6 communicating with the interior of the casing and through which the shank 2 is designed to pass as is shown clearly in Figs. 2 and 3, the spring 3' on said shank being mounted between the outer face of the casing 5 and said knob 4. This casing 5 is designed to inclose and protect the rubber cup 1 and also to balance the frame of the mirror or other article to be supported thereby and said casing may be of any suitable or desired configuration and ornamented in any desired manner.

A mirror 7 is shown to the frame 8 of which is secured a laterally extending tube 9 which projects centrally from said frame and is designed to telescopically engage the tube 6 of the casing 5 as is shown clearly in Figs. 1 and 2 and which provides for the removal of the mirror when desired. This tube 9 is adjustably mounted on the frame 8 preferably having its inner end flattened and apertured to receive a thumb screw which is designed also to pass through an apertured bracket 10 fixed to the rear face of the frame 8 and which provides for the adjustment of said frame 8 relatively to the tube 9 for positioning the mirror at any desired angle.

In the operation of this device the rubber suction cup is first wet and engaged with the surface on which it is to be mounted as shown in Fig. 3 with the edge of the casing 5 also engaging said surface. This cup is then pressed firmly against its supporting surface by exerting pressure on the knob 4 which will force the shank 2 inwardly against the tension of the spring 3 and expand the cup as shown in Fig. 2 causing it to reliably engage the surface on which it is to be mounted. After this suction member has been mounted on the supporting wall or other surface, the mirror section may be engaged therewith by slipping the tube 9 over the tube 6 and the mirror may be adjusted at any desired angle either before or after its application to the suction supporting device.

The forcing of the stem 2 inwardly against the tension of spring 3' will serve to compress said spring and cause it to bear against the casing 5 within its tubular stem or shank 6 and force said casing into engagement with the supporting surface S where it will be held by the engagement of the suction cup with said surface.

To detach the support the balance frame or inclosing casing 5 is moved forwardly against the tension of spring 3' out of engagement with the supporting surface S to afford access to the cup 1 and by pinching the cup or disengaging the edge thereof from the supporting surface it may be readily released and the device removed for packing or storing or it may be moved to another support as may be desired.

I claim as my invention:

1. A suction supporting device comprising a suction cup, a stem secured to said cup, a cup inclosing casing having an opening therein through which said cup stem passes, a tubular shank fixed to said casing around the opening therein and beyond the free end of which said cup stem projects, a knob on the free end of said cup stem, a coiled spring encircling said cup stem between said knob and the outer wall of the casing within the tubular shank thereof, and an article to be supported having a tubular member for telescopic engagement with the shank of said casing.

2. A suction supporting device comprising a suction cup, a stem secured to said cup, a cup inclosing casing having an opening therein through which said cup stem passes, a tubular shank fixed to said casing around the opening therein and beyond the free end of which said cup stem projects, a knob on the free end of said cup stem, a coiled spring encircling said cup stem between said knob and the outer wall of the casing within the tubular shank thereof, an article to be supported having a tubular member for telescopic engagement with the shank of said casing, and means for adjustably connecting said tubular member with said article.

In testimony whereof I have hereunto set my hand in presence of two subscribing witnesses.

JOHN G. KNABE.

Witnesses:
J. E. BIRD,
P. M. SULLIVAN.